United States Patent [19]
Muka

[11] 3,771,863

[45] Nov. 13, 1973

[54] MICROFICHE IMAGE SELECTION DEVICE

[75] Inventor: Edward Muka, Rochester, N.Y.

[73] Assignee: Eastman Kodak Company, Rochester, N.Y.

[22] Filed: June 7, 1971

[21] Appl. No.: 150,697

[52] U.S. Cl. .................................... 353/27, 355/40

[51] Int. Cl. .......................................... G03b 23/08

[58] Field of Search .................. 353/27, 25; 95/4.5; 355/40

[56] References Cited

UNITED STATES PATENTS

| | | | |
|---|---|---|---|
| 3,566,524 | 3/1971 | Irasek | 353/27 |
| 3,330,191 | 7/1967 | King et al. | 95/4.5 R |
| 3,117,491 | 1/1964 | Stern | 353/25 |
| 2,296,141 | 9/1942 | Brown et al. | 353/25 |

*Primary Examiner*—Louis R. Prince
*Assistant Examiner*—Steven L. Stephan
*Attorney*—Robert W. Hampton, Paul R. Holmes and Lloyd F. Seebach

[57] ABSTRACT

A device for positioning a selected one of a plurality of images arranged in rows and columns on a record medium relative to the optical axis of a projection system and in which such device is located in a preselected position for receiving the record medium and for removing the same.

9 Claims, 8 Drawing Figures

EDWARD MUKA
INVENTOR.

BY Lloyd F. Seebach

AGENT

EDWARD MUKA
INVENTOR.

BY Lloyd F. Seebach

AGENT

EDWARD MUKA
INVENTOR.
BY Lloyd F. Seebach
AGENT

EDWARD MUKA
INVENTOR.
BY Lloyd F. Seebach
AGENT

EDWARD MUKA
INVENTOR.
BY Lloyd F. Seebach
AGENT

MICROFICHE IMAGE SELECTION DEVICE

FIELD OF THE INVENTION

The invention relates to a device for positioning a selected one of a plurality of images arranged in rows and columns on a record medium relative to the optical axis of a projection system and, more particularly, to a device in which such a record medium is located in a preselected position for insertion and removal of the record medium.

DESCRIPTION OF THE PRIOR ART

The prior art discloses many devices for handling a record medium, for example, a microfiche having images arranged in rows and columns thereon for positioning or locating any one of the images relative to the optical axis of a projection system. The mechanisms by which the microfiche or record medium is moved are basically slide devices having guides so arranged that the microfiche can be moved in either or both of the X-Y directions. In most instances, the carrier for the microfiche is moved to a fully extended position generally outside of the viewer casing or housing in which the mechanism is contained so that microfiche can be readily arranged and positioned on the carrier. Further, the microfiche is usually arranged and moved in a flat plane that is normal to the optical axis. Such a structure necessitates that means be provided for holding the microfiche flat in this plane. Usually, the selected image must be located by trial and error, unless means is provided for relating the respective image areas to scales that are provided on the device. In this case, each scale must be referred to individually in order to obtain location of the proper image relative to the optical axis in both of the X-Y directions.

SUMMARY OF THE INVENTION

One object of the invention is to provide a device for manipulating a record medium having a plurality of images arranged in rows and columns thereon which requires only that the record medium be inserted in the device and that selection of an image be made, the actual location of the selected image relative to an optical axis being accomplished automatically.

Another object of the invention is to provide a device in which a record medium having a plurality of images arranged in rows and columns can be manipulated so as to successively position selected images relative to the optical axis of a projection system in a minimum amount of time.

Still another object of the invention is to provide a device for manipulating a record medium having a plurality of images arranged in rows and columns thereon in which the record medium is arranged in a predetermined position for removal from the device and in which the record medium is available to the operator only to insert and remove from the device.

Yet another object of the invention is to provide a device for manipulating a record medium having a plurality of images arranged in rows and columns thereon in which the record medium is inserted in the device, withdrawn into the device, and manipulated to locate selected images only when wholly within the device and inaccessible to the operator.

These and other objects and advantages of the invention will be apparent to those skilled in the art by the description which follows.

The manipulation of a record medium or microfiche having a plurality of images arranged in rows and columns thereon is accomplished by inserting the record medium into a slot, the inserted end being clamped to a carrier which draws the record medium totally within the casing or housing of the device. The operator can then select an image that is to be projected onto a screen. When making the selection, one or both of a pair of stepping motors is energized, one stepping motor being operatively and directly connected to a carrier for the record medium for moving the carrier relative to the longitudinal axis of a transport means which supports the carrier. The transport means is connected to the other stepping motor via a cable drive and is movable along its longitudinal axis. As a result, the energization of one or both of the stepping motors will position the selected image on the record medium relative to the optical axis. The transport means and carrier means are moved into a predetermined position in order to permit removal of the record medium. When the transport means is moved into a position relative to the station through which the record medium is inserted or withdrawn, means is provided to align the transport means with the station and to actuate releasable means on the carrier means to free the record medium for removal.

DESCRIPTION OF THE DRAWINGS

Reference is now made to the accompanying drawings in which like reference numerals designate like parts and wherein.

DESCRIPTION OF THE PREFERRED EMBODIMENT

Figures 1, 2:
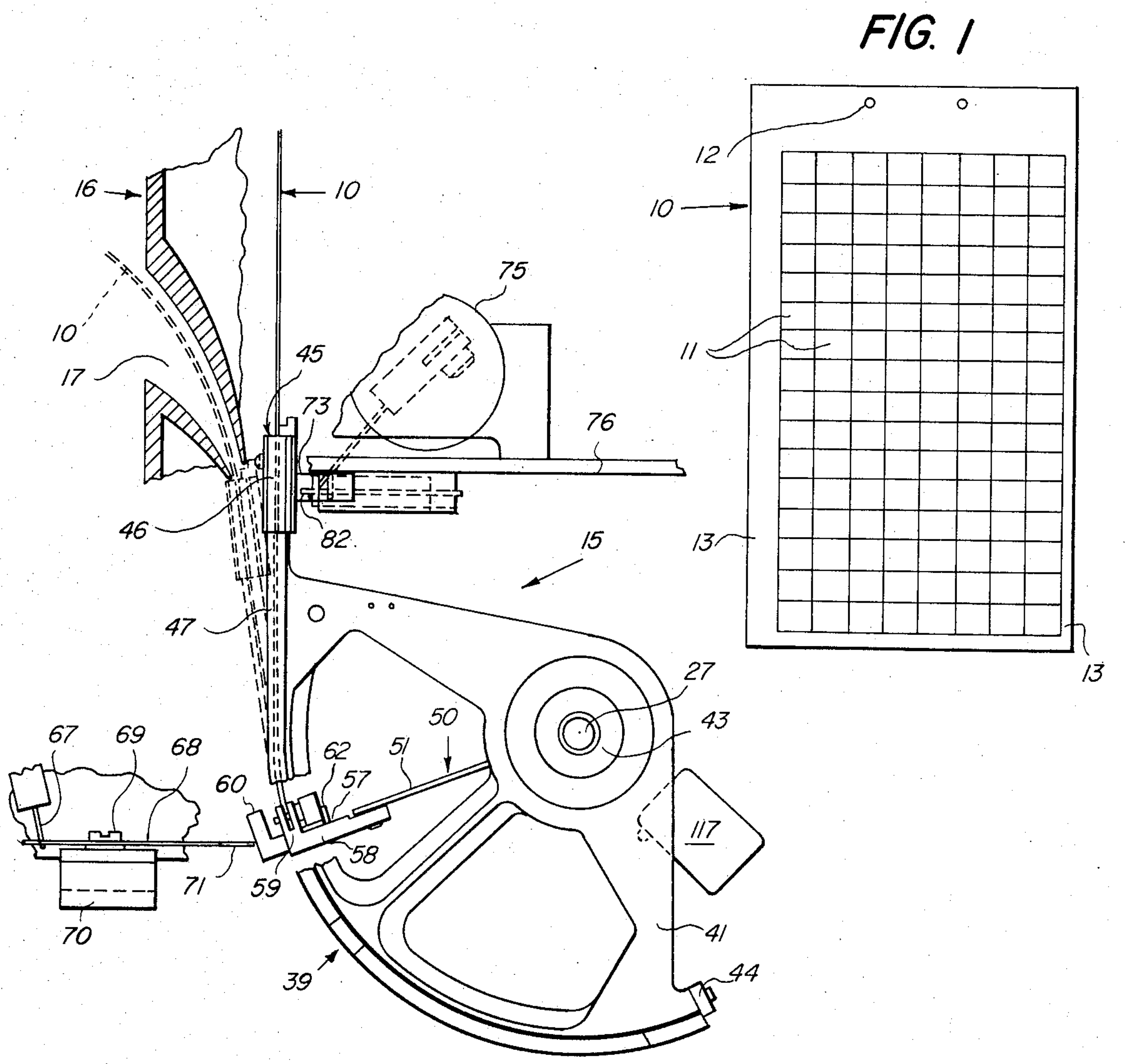
FIG. 1 is an elevational view of a record medium format showing the arrangement of the images thereon.
FIG. 2 is a side elevational view showing the relation of the device comprising the invention relative to a fixed station in a casing or housing.

With reference particularly to FIG. 1, a record medium or microfiche 10 comprises a sheet of film on which a plurality of images 11 are arranged in X-Y directions or in rows and columns. Along one edge, which will be leading edge on insertion into the device to be described, a pair of spaced holes 12 are provided for a purpose to be described hereinafter. Such a record medium is well known in the art; and in accordance with the system that is used, the record medium can be transparent in which case a transmission projection system is used, or can be opaque, for example, a photographic paper, in which case a reflection projection system will be used. In either case, the invention is concerned primarily with locating a selected one of the images relative to a projection system in a minimum amount of time.

Figures 4, 8:
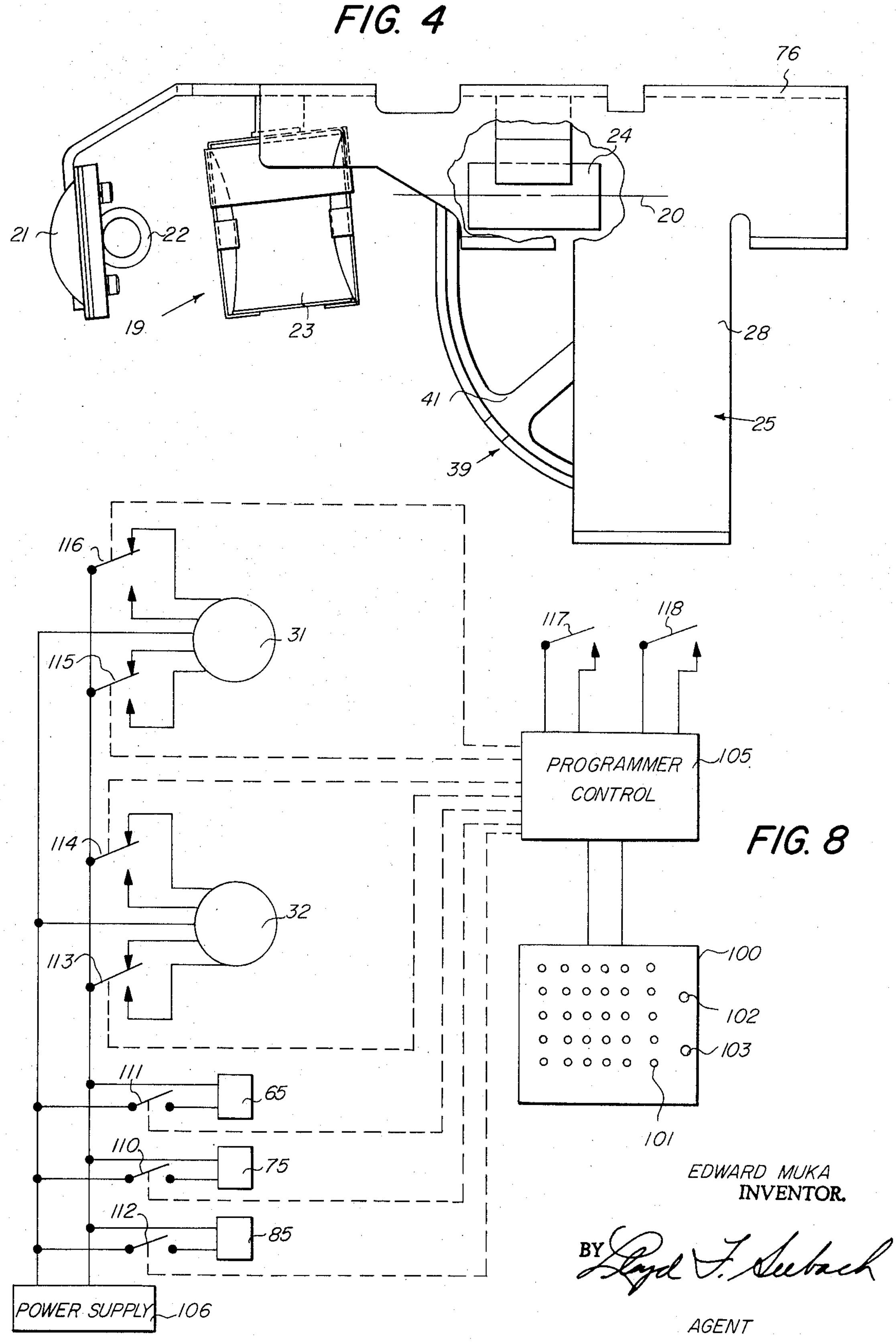
FIG. 4 is a side elevational view showing the relationship of the optical projection system to the device for manipulating the record medium.
FIG. 8 is a schematic wiring diagram showing the manner in which the operation of the device is controlled in conjunction with the operating solenoids and a programmer control.

The device, generally designated by the numeral 15, is arranged within a casing of housing 16 only a small portion of which is shown in FIg. 2. The casing 16 is provided with a slit or throat 17 into which a record medium can be inserted for engagement by the device 15. With reference to FIG. 4, an optical system 19 is arranged within casing 16 relative to an optical axis 20 and comprises a reflector 21, a projection lamp 22, a condenser lens system 23, and a projection lens system 24 which directs the selected image onto a screen (not shown) that is mounted on the casing 16 with reference to the viewing position of the operator. The optical system 19 is mounted on the underside of a U-shaped mounting member 25. The throat 17, therefore, provides and serves as a fixed station through which the record medium 10 can be inserted into and withdrawn from the device by the operator.

Figure 5:
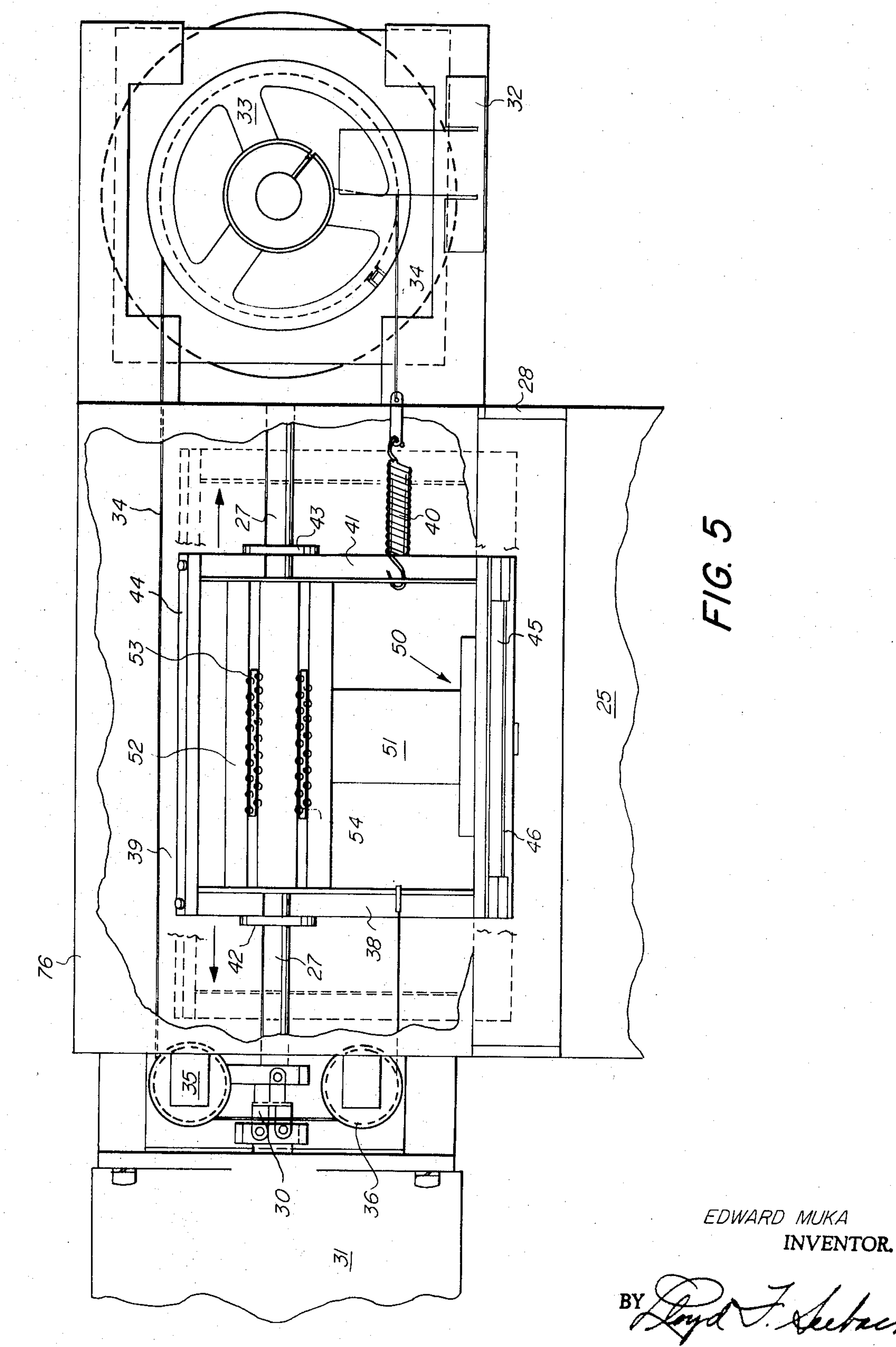
FIG. 5 is a plan view showing the manner in which a respective stepping motor is operatively connected to the transport means and to the carrier means for moving the record medium.
Figure 6:
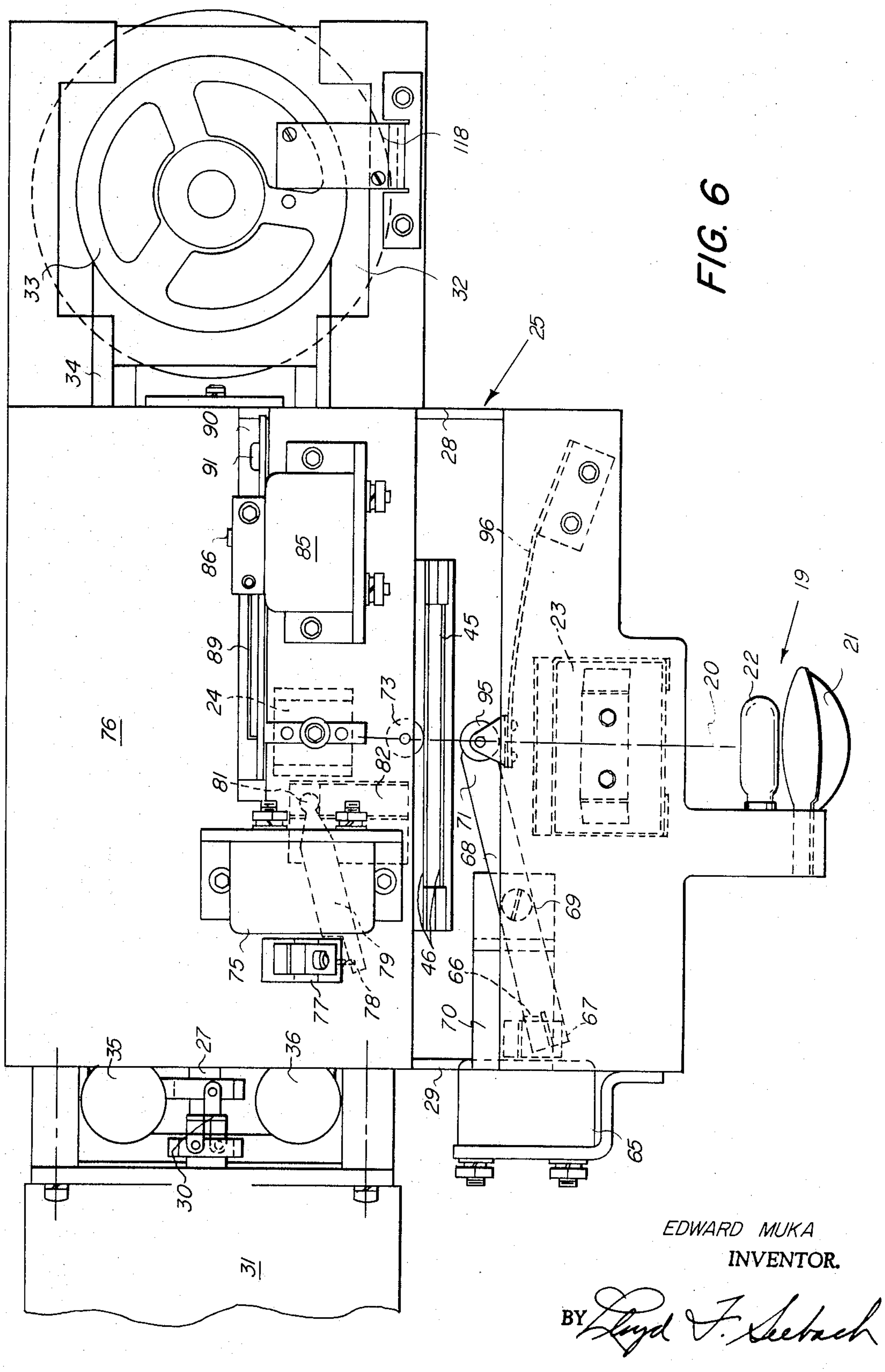
FIG. 6 is a plan view similar to that shown in FIG. 5 in which various operating solenoids are shown.

The device 15 is mounted relative to a shaft 27 that is journaled in the side plates 28 and 29 of member 25, the one end being directly coupled at 30 to a stepping motor 31, see FIG. 5 and 6. A stepping motor 32 is mounted adjacent the other end of shaft 27 and carries a pulley 33 which is engaged by a cable 34 which, in turn, encircles the spaced pulleys 35 and 36 adjacent stepping motor 31. One end of the cable 34 is connected or anchored to one side frame member 38 of transport means 39 and the other end is connected by spring 40 to another side frame member 41 of transport means 39.

The transport means 39 comprises the side frame members 38 and 41 having bearing portions 42 and 43, respectively, and a tie bar 44 which joins the frame members at one end, see FIG. 2. At the opposite end, a viewed in FIG. 2, and enclosed opening 45 is formed by a plurality of shim plates 46, as also seen in FIG. 5. The inner surface of each of frame members 38 and 41 is provided with a generally arcuate recess 47 for engaging the side edges 13 of record medium 10.

Carrier means 50 for the record medium 10 comprises a plate 51 that is mounted relative to shaft 27 by a coupling designated by the numeral 52. Such a coupling is one in which a cage 53 is provided with a plurality of balls 54 in engagement with shaft 27, the structure being such that it permits movement of transport means 39 and carrier means 50 as a unit along shaft 27 and movement of carrier means 50 about shaft 27 independently of transport means 39. The manner in which this is accomplished by stepping motors 31 and 32 will be described more fully hereinafter.

Figure 3:
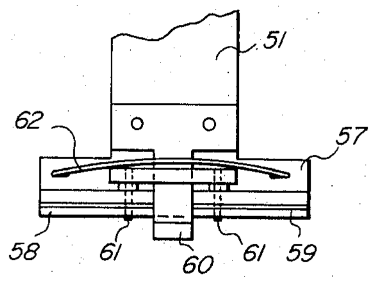
FIG. 3 is a partial plan view showing means for engaging a record medium during movement thereof in the device.

The plate 51 carries an L-shaped member 57, see FIGS. 2 and 3 the leg 58 of which is provided with a slot 59, which is aligned with the recesses 47 in members 38 and 41, for receiving the leading end of the record medium 10 that is inserted in the throat 17. Centrally of member 57, a slide member 60 is mounted relative to member 57 and carries a pair of spaced pins 61 for engaging the correspondingly spaced apertures 12 in the record medium 10. The slide member 60 is urged in a direction toward the record medium 10 by a spring 62 so as to normally maintain the pins 61 in engagement with the record medium 10, thereby holding the record medium during movement within the casing 16 in the course of positioning the selected images relative to the optical axis 20 of the optical system 19.

Figure 7:
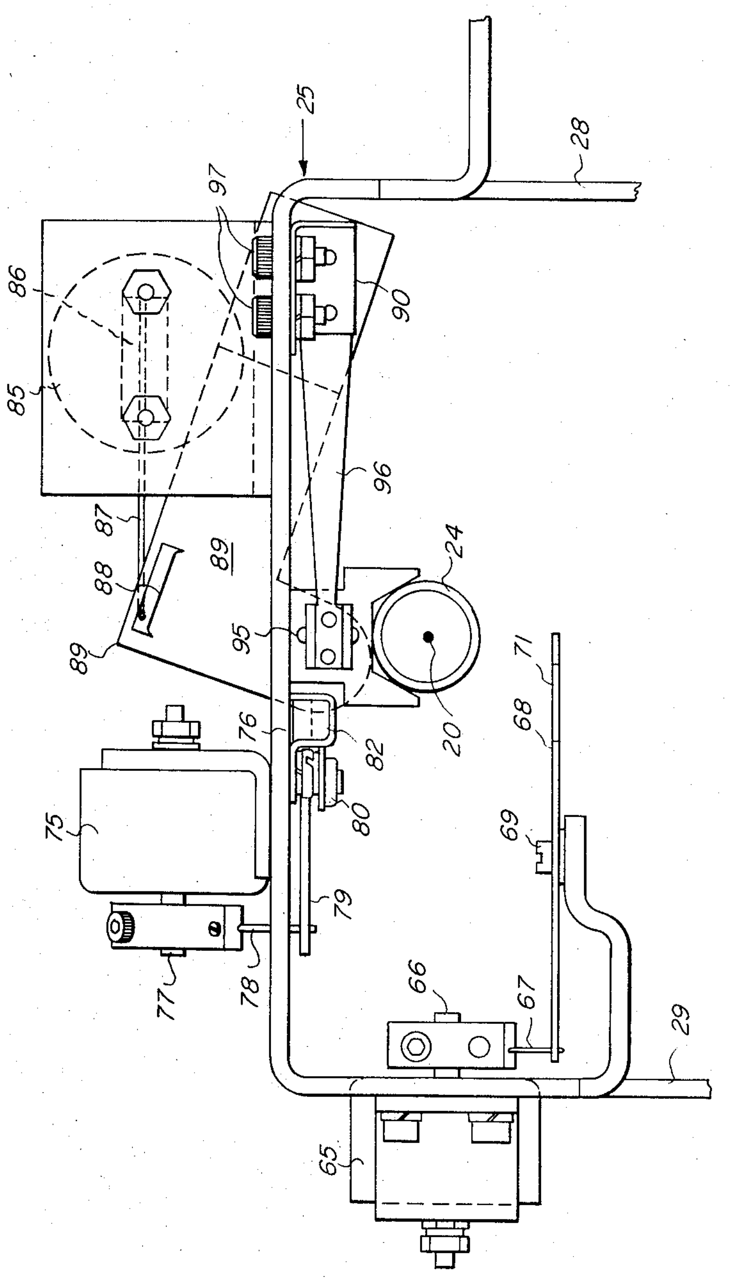
FIG. 7 is a rear elevational view showing the various operating solenoids and, particularly, the shutter arrangement for blocking the projection system while changing a record medium.

With reference to FIGS. 6 and 7, a number of operating solenoids are disclosed which are associated with the device to perform a definite operation in a predetermined sequence relative to a cycle of operation. Solenoid 65 is a rotary solenoid and is mounted on the side plate 29. With rotary motion of its armature 66, a pin 67 engages the end of a lever 68 that is pivotally mounted at 69 intermediate its end on an extension 70 of plate 29. The end 71 of lever 68 engages the slide member 60 to urge it in a direction toward shaft 27 as seen in FIG. 2, in order to disengage pins 61 from the holes 12 in the record medium 10. Rotary solenoid 75 is mounted on the intermediate section 76 between plates 28 and 29 of member 25 and the rotary motion of its armature 77 moves a pin 78 against a lever 79 pivotally mounted on the undersurface of section 76 at 80, the free end 81 engaging an actuating member 82 that is slideably mounted for movement toward the plates 46 as will be described hereinafter. Rotary solenoid 85 is also mounted on section 76 and, upon rotation of its armature 86 in a counterclockwise direction, as seen in FIG. 7, a rod 87 in engagement with a slot 88 in a shutter member 89 causes the shutter member that is pivotally mounted on a bracket 90 at 91 to move relative to the projection lens system 24 so as to block projection of any image on the screen.

Means for selecting an image to be projected on the screen comprises a selector, designated by the numeral 100, which is provided with a plurality of keys or buttons 101 each of which corresponds to the location by row and column of an image 11 on the record medium 10. The selector 100 is also provided with an insert or load button 102 and a start button 103. A programmer control 105 comprises circuitry for providing a complete sequence of operation for the device 15. For example, the programmer control 105 will remember the position by row and column of the selected image that is currently in the projection station and its relation on the record medium 10 to the next selected image to be positioned in the projection station. In this way, proper instruction for the direction of rotation of the stepping motors 31 and 32 is provided. As a result, there is no need for the operator to have access to the record medium 10, at any time, except for insertion and withdrawal thereof from throat 17.

The manner in which a cycle of operation is accomplished can be best described in connection with the schematic wiring diagram shown in FIG. 8 and the disclosure in FIG. 2. Normally, the transport means 39 with carrier means 50 will be positioned relative to throat 17 with the transport means 39 pivoted so the opening 45 is aligned with throat 17, the transport means being moved into this position by the energization of solenoid 75 and the engagement of member 82 with the plates 46 forming opening 45. When member 82 is moved to the left, as viewed in FIG. 2, transport means 39 pivots about shaft 27 to align opening 45 with throat 17. When in this position, the plates 46 are urged against a roller 95 that is carried on the free end of a leaf spring 96 secured to the underside of section 76 with screws 97. The spring 96 serves to maintain the plate 46 against rod 82 so as to insure proper alignment of the opening 45 with the throat 17. Also, when solenoid 75 is deenergized, spring 76 urges transport means 39 into a normal operating position in which it is held against a bearing or stop member 73 on the underside of member 76.

It is assumed at this time that the device is in an operating condition and that a power supply 106 has been connected to the various elements as generally shown in FIG. 8. In this connection, the programmer control 105 has energized suitable means in its circuitry for maintaining a switch 110 in a closed position to maintain solenoid 75 energized. Also, when in this position, the programmer control maintains switch 111 in a closed position so the solenoid 65 is maintained in an energized condition. Under this condition, solenoid 65 maintains end 71 of lever 68 against slide member 60 so the pins 61 are withdrawn, thereby maintaining the slot 59 free to accept the end of a record medium. Also, the programmer control 105 maintains switch 112 in a closed position to maintain solenoid 85 in an energized condition thereby holding the shutter member 89 in an obstructing position relative to the system 24.

With the various parts in the positions just described, a record medium 10 can be inserted in the throat 17. The record medium is urged downward and is edge-guided by opening 45 into the recesses 47 in the transport means 39 which, in turn, direct the leading end of the record medium into the slot 59 in member 57 of the carrier means 50. When the record medium has been positioned in this way, a portion thereof may still be extending from the throat 17. At this point, the operator actuates start button 103 which through programmer control 105 first cuts out the solenoid 65 so that pins 61 can engage the holes 12 in the record medium 10. Next, through the programmer control 105, stepping motor 31 will first be energized by closing, for example, switch 113 so shaft 27 will be rotated in a counterclockwise direction (FIG. 2) to move carrier means 50 in the same direction, thereby drawing the record medium 10 into the casing and along the recesses 47 in the side plates 38 and 41. Since motor 31 is a stepping motor, the movement of carrier means 50 is intermittent. When carrier means 50 has reached a position in which the record medium 10 is wholly within opening 45 and within casing 16, switch 117 is closed, thereby providing a signal to programmer control 105 to open switches 110 and 112 so transport means 39 will be returned to its normal position by spring 96 with deenergization of solenoid 75 and shutter member 89 will be withdrawn from its obstructing position to a position as shown in FIG. 7. Switch 118 together with switch 117, respectively, determine the extreme position of transport means 39 relative to one end of shaft 27 and of carrier means 50 as described above and supply an initiating signal for programmer control 105. With the record medium 10 completely withdrawn within the casing 16 and the transport means 39 in the full line position as shown in FIG. 2, any movement of carrier means 50 in a clockwise direction (FIG. 2) will now move the record medium in a plane to the right of throat 17, as seen in FIG. 2, which will be totally within the casing 16 so the operator will have no access to the record medium 10 during projection of any image. Since a button 101 has been actuated for a selected image, the motor 32 will be energized so as to actuate or move transport means 39 along shaft 27 in increments until the column corresponding to the selected image is positioned relative to the optical axis of the projection system. The direction of rotation of motor 32 will be determined by programmer control 105 with the closing of either switch 113 or switch 114. The movement of motor 32 is imparted to transport means 39 by means of cable 34 and the drive system associated therewith.

At the same time, stepping motor 31 can be energized to rotate shaft 27 in the proper direction to move carrier means 50 about the axis of shaft 27 in order to position record medium 10 with the row in which the selected image is located relative to the optical axis. Depending on the image that has been selected, either one or both of motors 31 and 32 can be energized and be operative at the same time. Again, the respective motor or motors to be energized and the respective direction of rotation will be determined by programmer control 105 via switches 113, 114, 115 or 116. As stated above, the programmer control 105 will remember the position of the image being projected and determine the relation of the next selected image thereto. As a result, the required direction of rotation of each of motors 31 and 32 is determined automatically.

When the operator desires to withdraw the record medium 10 from the device, button 102 is actuated which results in the following sequence of operation. Irrespective of the position of the transport means 39 and carrier means 50 relative to the sahft 27, the motors 31 and/or 32 are energized to move the transport means and carrier means into a predetermined position relative to the optical axis 20 of the projection system 19. In this case, the carrier means 50 will be rotated to a maximum position in a counterclockwise direction and the transport means will be positioned along shaft 27 such that the preselected column on record medium 10 is properly oriented with respect to the optical axis 20 so as to be positioned centrally relative to the throat 17. When the transport means 39 and carrier means 50 are in this position switches 117 and 118 will be closed, this action provides a signal to the programmer control 105 for energizing solenoids 65, 75 and 85 in proper sequence. The solenoid 85 can be first energized to move the shutter 89 into its light-obstructing position. Also, load solenoid 75 can be energized at the same time to move the transport means 39 into alignment with throat 17 so that with movement of carrier means 50 the record medium 10 will be directed and moved into the throat 17. When the carrier means 50 reaches the end of its travel, the solenoid 75 is energized so as to release pins 61 from holes 12 in the record medium 10, thereby permitting the operator to withdraw the record medium. Again with the various parts in the positions just described, another record medium 10 can be inserted in throat 17 and the cycles of operation just described will be respeated with respect to each selected image.

While the device described hereinabove has been disclosed in connection with image selector 100, the manner in which the image selection is made can vary without altering the cycle of operation of the device according to the invention. For example, image selection may be associated with a program of image projection in which the images are randomly arranged so some means or device for making the proper selection is necessary. Instead of a single button 101 as disclosed herein, a button corresponding to the X direction and another to the Y direction may be actuated to obtain the same ultimate result. Also, no reference has been made to the increment of movement required so as to move the record medium 10 in either direction. Inasmuch as the image size on the record medium can vary depending on the recording magnification, the increment of the movement of motors 31 and 32 will have to be associated with and related to actual physical size of the image areas and the number of such images recorded on the record medium.

The invention has been described in detail with particular reference to the preferred embodiments thereof, but it will be understood that variations and modifications can be effected within the spirit and scope of the invention.

I claim:

1. For use in apparatus having an optical axis and a passageway into which a record medium having thereon a plurality of images arranged in rows and columns can be inserted and withdrawn, a device for locating a selected one of the plurality of images relative to the optical axis comprising:

support means having an operational axis that is spaced from an normal to the optical axis;

transport means having an opening and spaced recesses extending from said opening for receiving opposed edges of an inserted record medium, said spaced recesses defining a prescribed path through which the record medium is moved, said transport means being mounted on said support means for pivotal movement about and axial movement along said operational axis, said pivotal movement being between a first position wherein said opening is aligned with the passageway to permit insertion and withdrawal of the record medium from said transport means and a second position wherein said spaced recesses direct the movement of the record medium within the apparatus and along said prescribed path into an intersecting relation with the optical axis;

means coupled to said transport means for pivotally moving said transport means about said operational axis so as to move said opening between said first and second positions;

means coupled to said transport means for moving said transport means axially of said operational axis to position a selected column of images relative to the optical axis;

carrier means mounted for pivotal and axial movement relative to said operational axis for moving the record medium in one direction along said prescribed path completely into the apparatus and in a reverse direction to permit removal therefrom, when said transport means is in said first position, and for moving the record medium in either of said directions along said prescribed path, when said transport means is in said second position, to position a selected row of images relative to the optical axis;

means mounted on said carrier means and movable therewith for releasably engaging the record medium when inserted into said opening;

means coupling said carrier means to said transport means for permitting movement of the record medium along said prescribed path independent of and concurrent with movement of said transport means along said operational axis; and means operatively connected to said means for moving said transport means axially of said operational axis and to said carrier means and responsive to the selection of a particular one of the images for controlling the movement of said transport means and said carrier means, whereby the record medium is moved to locate that particular image relative to the optical axis.

2. A device in accordance with claim 1 including means arranged adjacent said engaging means, when said transport means is in said first position, for actuating and holding said engaging means in a released position during movement of the record medium through the passageway.

3. A device in accordance with claim 1 wherein said means for pivotally moving said transport means includes electrically operable means arranged relative to said spaced recesses for engaging and pivoting said transport means into said first position.

4. A device in accordance wth claim 1 including means comprising a shutter arranged in a normally displaced position relative to the optical axis responsive to movement of said transport means to said first position for moving said shutter into a light blocking position relative to such an optical axis.

5. A device in accordance with claim 1 wherein said means for moving said transport means axially of said operational axis comprises a stepping motor and a cable drive connecting said motor to said transport means.

6. A device in accordance with claim 1 wherein said means for coupling said carrier means to said transport means comprises a shaft defining said operational axis, a stepping motor directly coupled to said shaft, and means for coupling said carrier means to said shaft for synchronous movement thereabout.

7. A device in accordance with claim 1 wherein said operatively connected means includes means for producing a start signal, means responsive to said start signal for effecting movement of said transport means to said first position and for holding said engaging means in a released position to permit said carrier means to engage the record medium upon insertion thereof into the passageway.

8. A device in accordance with claim 7 wherein said engaging means comprises at least one releasable pin for engaging the record medium.

9. A device in accordance with claim 7 wherein said operatively connected means includes means for producing a control signal to initiate withdrawal of the medium from the apparatus, and means responsive to said control signal for moving said transport means axially into a predetermined position such that said selected column of images is aligned with the passageway, and for moving said carrier means pivotally such that the record medium is displaced from such a passageway.

* * * * *